Nov. 16, 1926. Re. 16,480

W. CLAUSON

SPRING MOUNTING

Original Filed March 18, 1922. 2 Sheets-Sheet 1

INVENTOR
William Clauson
BY Harry D. Peck
ATTORNEY

Nov. 16, 1926. Re, 16,480

W. CLAUSON

SPRING MOUNTING

Original Filed March 18, 1922 2 Sheets-Sheet 2

INVENTOR
William Clauson
BY Harry D. Peck,
ATTORNEY

Reissued Nov. 16, 1926.

Re. 16,480

UNITED STATES PATENT OFFICE.

WILLIAM CLAUSON, OF BOSTON, MASSACHUSETTS, ASSIGNOR TO CLAUSON SPRING CO., OF BOSTON, MASSACHUSETTS, A CORPORATION OF MASSACHUSETTS.

SPRING MOUNTING.

Original No. 1,572,106, dated February 9, 1926, Serial No. 544,798, filed March 18, 1922. Application for reissue filed September 29, 1926. Serial No. 138,530.

This invention relates to improvements in spring mountings. More especially it relates to improved means for yieldingly supporting a body so that all its parts will be constrained to move together uniformly toward or away from the bearing upon which the mounting means rest. The principles of the invention have been particularly worked out, and are herein illustrated and described, as they may be applied to the body of a vehicle.

Various devices have been designed for yieldingly mounting the body of the running gear of a vehicle so that the vibrations of the latter may be absorbed as far as possible by the mounting means and the body permitted to ride smoothly. So far as I am aware, nearly all such devices have involved the use of so-called laminated or leaf spring members mounted singly in different locations between the running gear and the body and even when, in some few cases, one spring has been used to support another in part, there has been no attempt to make the effect of such spring mountings uniform. These members for the most part act individually and constitute an aggregation of resilient units, each of which must be strong enough to support its apportioned part of the weight of the body and if necessary almost the whole of any normal load, there being no provision for the distribution of the latter. And in the case of self-propelled vehicles and especially in that type embodying the socalled Hotchkiss drive where the vehicle is pushed forward through the spring members the latter must have very great strength to withstand the rear axle torque and to effect transmission of the driving force. As a result each resilient member is made so stiff and strong as to flex but little and consequently absorbs only a small part of the vibrations. A body supported in this manner is subject to almost the full force of a blow received by the running gear and this has led to the adoption of shock absorbers, snubbers and the like. Even with the aid of the latter there is still a great deal of side sway or rocking and the vibrations are at best only somewhat reduced. Furthermore the desirability of using solid rubber tires on all classes of vehicles has added to the problem of suitably supporting the body and loads, so that there is need for an improved means of support which will actually absorb the jars and blows given the running gear and thus prevent their transmission to the body, the passengers, the load and the continuously altering of the normal level position of the latter.

To this end the present invention is directed and it is among its objects to provide a spring suspension construction that will take up and absorb the vertical movements of the running gear, eliminate the side sway and teetering, and thus cause the vehicle to ride smoothly and without appreciable jarring thereby avoiding discomforts to the occupants and injury to the vehicle. A further object is to replace the common separately-acting leaf springs by apparatus whereby the load upon any part of a vehicle will be equally supported by all the spring members acting jointly. A further object is the provision of compensating means whereby the floor or body of the vehicle is maintained substantially level irrespective of whether the load is largely at one side or the other, or at either end. The invention further provides for independent absorption of the individual vibrations of each wheel, which may be effected without being distributed throughout the whole of the spring mounting, although when such vibrations are greater than the individual absorptive means can take care of they may be distributed among the other members of the resilient supporting means without causing jar to the body as a whole and without altering its so-called level. Another object is the provision of means whereby the impelling force of a self-propelled vehicle may be transmitted from the driving wheels to the body through rigid members, thus eliminating the utilization of the spring members for such purposes.

These objects are attained by providing a system of pivotally mounted levers so arranged with spring means that all coact to yieldingly support the body. In the specific embodiment of the invention disclosed, there is provided a pair of levers on each side of the vehicle, each fulcrumed at one end to the chassis and connected at the other end to the running gear. Between their fulcrums the levers have opposed segmental faces provided with gear teeth which intermesh, so that upon one lever being swung about its axis the other is likewise constrained to move. The other remote ends of these levers may extend beyond their connection with the running gear and be joined to the extremities of the chassis, but this is not necessary. The segmental ends of the levers are proportioned so as to constitute bell crank arms between which the spring means which provide the cushioning effect are interposed. These means constantly tend to spread the bell crank arms apart and thus force downward the remote ends of the levers but such tendency is limited by contact between segments at the ends of the gear-teeth. The connections between the levers and the running gear comprise additional coiled spring members by which the blows given the individual wheels may be almost entirely absorbed without affecting the levers themselves. The force of these axle springs is greater than the force exerted by the spring means acting on the bell crank arms so that it is the latter which permits the body to move relatively to the running gear, while the former permit individual movement of a single wheel when it strikes a stone or other obstruction. The reason for the stronger springs flexing instead of the weaker springs, upon a sudden movement of a wheel, is because the general inertia of the members through which the blow must be transmitted to the weaker springs hinders their response until the stronger springs, which are acted upon directly, have absorbed the vibration. The levers on one side are connected with corresponding members on the opposite side so that in effect the rear levers move as a unit and the front levers do likewise; and because of the gear teeth connection between those on the same side of the frame all four move simultaneously about their respective pivots. As a result whenever the body or chassis is forced downward at any point it tends to cause the lever arm nearest to that point to swing about its pivot on the frame, but movement of that one lever arm causes simultaneous movement of the others so that all other parts of the chassis move the same amount, thus maintaining the body in successively parallel positions relative to its initial position.

The invention is illustrated in the accompanying drawings as it may be applied to the chassis of an automobile, but the principles might equally well be applied to the support of any body which it is desirable to have yieldingly mounted in such manner that its horizontal level can be maintained as it moves toward or away from the base of its support. The drawings, therefore, are merely illustrative of one possible application of the invention and it is intended that the patent shall cover by suitable expression in the appended claims whatever features of patentable novelty exist in the invention disclosed.

Figure 1:
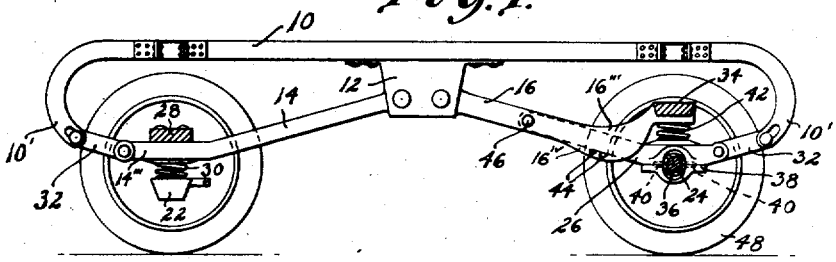
Figure 1 is an elevation on a section through the chassis on line 1—1 of Figure 2 showing the running gear and chassis of a vehicle embodying the invention.
Figure 2:
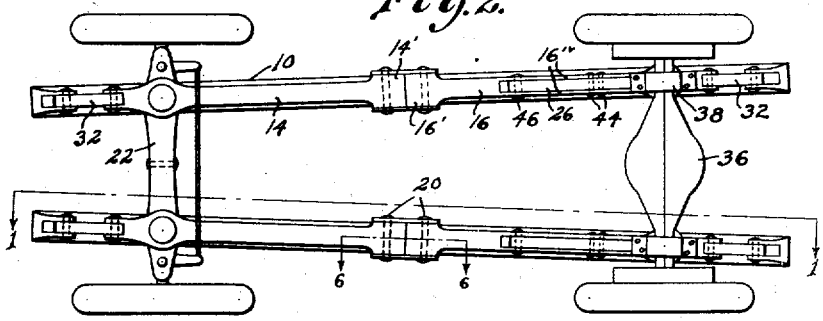
Figure 2 is a plan view as seen from the bottom.

Referring to the drawings, there is secured to the middle of each side member 10 of a chassis, a bracket having depending side plates 12 between which are pivotally mounted a pair of levers 14, 16 whose adjacent segmental ends 14′, 16′ are provided with inter-meshing gear teeth and portions constituting bell crank arms 14″, 16″. Between these crank arms and housed partly within them are coiled springs 18 which exert pressure on the arms tending to separate them and force the remote ends 14‴ and 16‴ of the levers downward about the fulcrum pins 20. The forward lever 14 is connected to the front axle 22 and the other lever 16 extends toward the rear axle 24 and is connected to the latter through a link member 26.

Considering first the arrangement at the front of the vehicle, the levers 14 on each side are rigidly connected by means of a cross arm 28 having a depending yoke adapted to be pivotally mounted on the axle 22, so that the arm and levers and the axle may swing or rock relatively to one another. This axle is provided with the conventional connections to the wheels whereby they may be turned together about separate pivots at the axle ends for steering. Between the axle and each forward lever 14 of the mounting means and preferably under the cross arm 28, there is provided a vertically coiled spring 30 which yieldingly opposes oscillation of the axle and the cross arm, thereby serving to cushion the sudden upward movement of either axle end caused by one of the front wheels striking an obstruction or dropping into a depression in the roadway. Whenever the two front wheels move upward or downward together, however, the axle cross arm and levers all swing together about the fulcrum pins 20 on the supporting bracket; but the clockwise swinging of the levers 14 acts through the gear teeth to cause counter-clockwise swinging of the rear levers 16 thus forcing the crank arms 14″ and 16″ against the springs 18 until the opposing force of the springs arrests the movements or until the faces of these bell crank arms contact with each other. When the force causing upward swing of the levers has been spent the springs 18 spread the bell cranks causing the levers to move downward again until the lower side of the segmental faces strike each other. This manner of limiting the swings of the levers is effected by cutting the gear teeth on just a portion of the contacting surfaces of the lever ends so that as the levers swing, their ends, above and below the gear teeth, must strike after a short rocking movement. This movement may be further limited by connecting the remote ends of levers with the chassis, one manner of so doing being by short links 32 which are pinned to the lever ends and have a pin slot connection with the turned under ends 10′ of the chassis.

The rear levers 16 extend for a ways on a direct line (shown dotted) toward the rear axle 24 but turn upward before reaching it to be rigidly secured to a cross arm 34 extending crosswise of the vehicle, preferably over the rear axle housing 36. This cross arm is not connected to the axle as is the front cross arm. Each lever 16 is recessed on its under side toward the rear to permit the connecting link 26 to fit into it. This link is pinned at its forward end to the lever and extends thence toward the rear axle along the same dotted line that is followed by the major portion of the lever. The link is provided with bearing blocks 38 which form journals for bearing pins 40 projecting at right angles from the rear axle casing 36. This arrangement of the pins in the bearings allows up and down movement of the axle ends, there being sufficient space in the bearing blocks to permit free movement of the axle casing. Thus the rocking movement of the rear axle, such as occurs when one wheel is raised or lowered above the other, may take place without any twisting of the link members connecting the axle housing with the levers. Between the link 26 and the cross arm 34 is a coiled spring 42, similar to that previously described in considering the front axle mounting, which tends to raise the cross arm and levers, but undue separation of the levers and links is prevented by cross pins 44 passing under the links 26 between the depending side positions 16′ of the rear levers. The rear coil springs perform the same function as the front coil springs in that when a severe blow is given to either rear wheel its sudden movement is absorbed by the coil spring nearest it on the rear axle, the axle itself pivoting slightly on the pins 40 in the bearing on the link and the link in turn swinging upward about its pivotal connection 46 with the lever arm. When the rear wheels are raised or lowered together, or if the chassis itself is raised or lowered with respect to the wheels, the lever arms 16 swing about the pivotal connections 20 on the bracket plates 12 thus allowing the rear axle and chassis to move nearer together. Such movement of the rear levers causes similar movement of the front levers, as heretofore described, due to the intermeshing ends of the levers.

Figure 3:
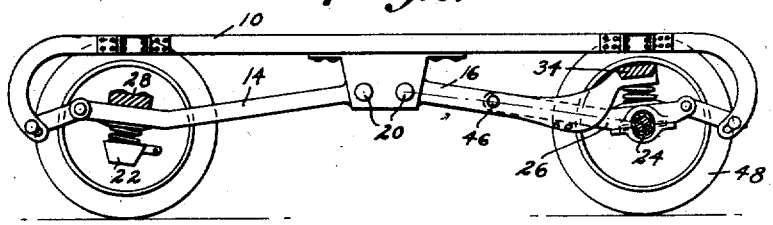
Figure 3 is a view similar to that of Figure 1 showing the rearrangement of the spring mountings when the chassis is loaded.
Figure 4:
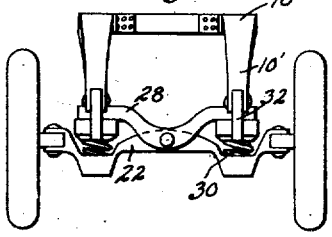
Figure 4 is a front view.
Figure 5:
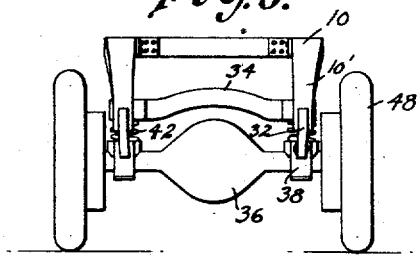
Figure 5 is a rear view.
Figure 6:
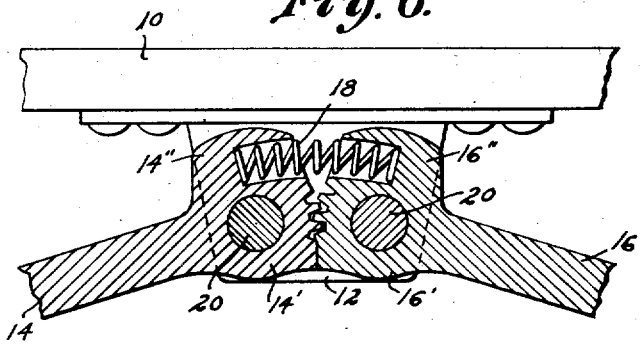
Figure 6 is an enlarged view on line 6—6 of Figure 2.

The relative position of the chassis and running gear when the chassis has been loaded, causing it to move near the ground is shown in Figure 3. The lowering of the body has caused the levers to swing, producing the consequent rearrangement of the mounting as shown. It is clear that the chassis is supported by the spring pressure exerted on the bell crank arms of the supporting levers which thus provides the cushioning effect necessary for easy riding; and since the levers are connected at one end through the gear teeth and at the other end through the cross arm it follows that all must move in unison and coact with the coiled springs to yieldingly support the chassis. The other coiled springs, between the front axle and levers in one case and between the rear axle and links in the other, allow a wheel to be suddenly raised or lowered a limited degree; but if movement of the wheel is so great as to be more than its coiled spring can take of, its movement would of necessity be transmitted to its own supporting lever and, as before described, cause corresponding movement of the other levers and the raising or lowering of the chassis as a whole. This occurs but infrequently however for the coiled springs on the axles are sufficiently strong to maintain the normal relation of the lever arms and chassis under ordinary road conditions. As these springs are stronger than the spring means between the bell crank arms, the depression of the chassis due to loading is taken care of through swinging of the levers and consequent contraction of the spring means between their bell cranks. The result is a uniformly positioned body which moves upward or downward without sidewise or endwise tipping, irrespective of where the load on it may be placed. This amounts to an equal distribution of the load upon the four wheels whereby the general wear and tear on the gear is more uniform than if the load were carried by any one or two of the wheels alone.

Another advantage attained by the present invention is the elimination of the flat leaf springs and the consequent undesirable torque effect which is now common to all cars having such springs. In the embodiment shown in the drawings the drive is direct from the rear wheel to the chassis through rigid unyielding members, namely, the rear wheel 48, the rear axle 24, the lever link 26, the pin connection 46 to the lever, thence through the lever 16 and its pivotal connection 20 to the supporting plates 12 and through the plate fastenings to the chassis 10. Such line of drive is illustrated by the dotted line in both Figures 1 and 3 and it is seen that the disadvantages of driving through spring members are eliminated.

The results achieved by the invention are ease of riding, the maintenance of the body level regardless of where the load is placed or the road conditions encountered, and the transmission of the driving power from the wheels through rigid members to the chassis. No shock absorbers or the like are necessary as the teetering is entirely done away with by the enforced uniform movement of the body toward or away from the running gear. By proper proportioning of the crank arm springs any desired degree of flexibility can be obtained, so that the cushioning effect of pneumatic tires can be compensated for if they are replaced with tires of solid rubber. It is obvious that the style of car is not an element entering into the situation, and therefore the invention may be applied to heavy trucks as well as to the lightest roadster. And the invention is not limited to vehicles, but may be adapted wherever the results which it makes possible are desired.

What I claim as my invention and desire to secure by Letters Patent is:

1. Mounting means for the chassis of a vehicle, comprising levers connected at one end of the running gear and at the other end fulcrumed to the chassis, whereby the relative movement of the chassis and running gear is effected; said fulcrumed ends having intermeshing segments adapted to cause simultaneous movement of the levers, whereby the chassis moves toward and away from the running gear; and spring means coacting with the levers to oppose movement of the chassis and running gear toward each other, between each lever and the axles whereby movement of the axle ends relative to the chassis is permitted without movement of the levers.

2. Mounting means for the chassis of a vehicle comprising a pair of levers connecting each side member of the chassis to each axle, whereby the relative movement of the chassis and axles is effected; said levers being fulcrumed to the chassis with their adjacent ends intermeshing whereby movement of one lever of a pair causes movement of the other lever; there being cross arms connecting the remote ends of each pair of levers whereby in conjunction with said intermeshing ends, all the levers are constrained to move together, thereby causing both side members to move simultaneously; and spring means acting between the levers of each of said pair to oppose movement of the chassis and axles toward each other.

3. Mounting means for the chassis of a vehicle comprising a pair of levers connecting each side member of the chassis to the axles, whereby relative movement of the chassis and axles is effected; the forward extending levers on each side being connected together and having a pivotal connection with the axles; the rearward extending levers on each side being connected together and having separate connections with the rear axle, said separate connections comprising a link pivoted to a lever and having a bearing for the axle; said pair of levers on each side being each fulcrumed to the chassis with their adjacent ends intermeshing; and spring means interposed between said adjacent ends opposing their approach to each other caused by the movement of the axles toward the chassis, said springs providing the cushioning effect for the mounting means.

4. Mounting means between the running gear and chassis of a vehicle adapted to absorb vibrations and to transmit driving force from the running gear to the chassis; said means comprising a pair of levers pivotally connected, one being pivotally mounted on the chassis and the other pivotally connected to the axle and both capable of oscillatory movement to provide a cushioning effect for vibrations; the said levers coacting to transmit the driving force from the axle to the chassis.

5. Mounting means for the chassis of a vehicle, comprising levers connected at one end to the running gear and at the other end fulcrumed to the chassis, whereby relative movement of the chassis and running gear is effected; said fulcrumed ends having intermeshing portions adapted to cause simultaneous swinging of the levers, and having portions adapted upon engagement to limit said swinging whereby the relative movement of the chassis and running gear is limited; and spring means coacting with the levers for yieldingly opposing their swinging upon movement of the chassis and running gear toward each other.

6. Mounting means for the chassis of a vehicle comprising a pair of levers rigidly connected together and yieldingly supporting the chassis upon the forward axle of the running gear; a second pair of interconnected levers yieldingly supporting the chassis upon the rear axle of the running gear; said pairs of levers having connections with one another adapted upon the yielding of one pair, to cause simultaneously yielding of the other pair whereby the chassis moves uniformly toward the running gear.

7. Mounting means for the chassis of a vehicle comprising an element pivoted on the chassis and extending over the rear axle of the vehicle, a second element pivotally connected to the first element and to the said axle; and cushioning means interposed between the said axle ends of the elements, and adapted to permit movement of the axle and the second said element toward the chassis without movement of the first said element.

8. Mounting means for the chassis of a vehicle comprising a system of levers each pivotally connected to the chassis midway of its ends and each connected by linkage to an end of the chassis; all said levers being interconnected and adapted to coact to maintain the chassis parallel to the ground irrespective of where a load is placed on the vehicle.

9. Mounting means for the chassis of a vehicle comprising, in combination, a member mounted yieldably on each side of the chassis and extending forward over the front axle of the vehicle; a member extending crosswise under the chassis connecting the forward ends of said yieldably mounted members and having pivotal connection with the said front axle, whereby the end of said axle can move toward and away from the chassis; and means interposed between the ends of said axle and the forward ends of said side members to provide a cushioning effect therebetween.

10. Mounting means for the chassis of a vehicle comprising, in combination, a lever mounted on each side of the chassis and extending forward over the front axle of the vehicle; a cross member connecting the forward ends of said levers and being itself pivotally mounted on said axle whereby the axle ends may move toward and away from the chassis; elastic means interposed between the ends of said levers and the axle ends to provide a cushioning effect therebetween; and means opposing the swinging of the levers whereby the vibration incident to movement of the axle toward and away from the chassis may be absorbed by the said elastic means.

11. Mounting means for the chassis of a vehicle comprising, in combination, a member mounted yieldingly on each side of the chassis and extending rearward over the rear axle of the vehicle; a member extending crosswise under the chassis connecting the rear ends of said yieldingly mounted members; each said side member having pivotal connection with the rear axle whereby the ends of said axle can move toward and away from the chassis; and means interposed between the ends of said axle and the rear ends of said side members to provide a cushioning effect therebetween.

12. Mounting means for the chassis of a vehicle comprising, in combination, a lever mounted on each side of the chassis and extending rearward to close by the rear axle of the vehicle; means connecting each said lever with the said axle whereby the axle can move toward and from the chassis while pivoting about an axis parallel to the longitudinal axis of the chassis; elastic means interposed between said axle and each said lever to provide a cushioning effect therebetween; and means opposing the swinging of said levers whereby the vibration incident to movement of the axle toward and away from the chassis may be absorbed by the said elastic means.

13. Mounting means for the chassis of a vehicle comprising, in combination, a lever mounted pivotally on each side of the chassis and extending forward to near the front axle of the vehicle; means joining both said forward extending levers and having a single pivotal connection with the said front axle; other levers mounted pivotally one on each side of the chassis, and extending rearward to near the rear axle of the vehicle; a pivotal connection between each said rearward extending lever and the rear axle thereby forming a three point pivotal connection between all said levers and the vehicle axles; and means opposing the swinging of the lever whereby a cushioning effect is provided between the axles and the chassis.

14. Mounting means for the chassis of a vehicle comprising, in combination, a system of levers having pivotal connections with the sides of the chassis and having pivotal connections with the axles; the last said connections being three in number and disposed with two connections to one axle and one connection with the other; and means opposing the swinging of the levers to provide a cushioning effect between the chassis and said axles.

WILLIAM CLAUSON.